Nov. 10, 1925.  1,560,966
L. M. BOWLUS
ICE BOX
Filed Aug. 23, 1923   3 Sheets-Sheet 1
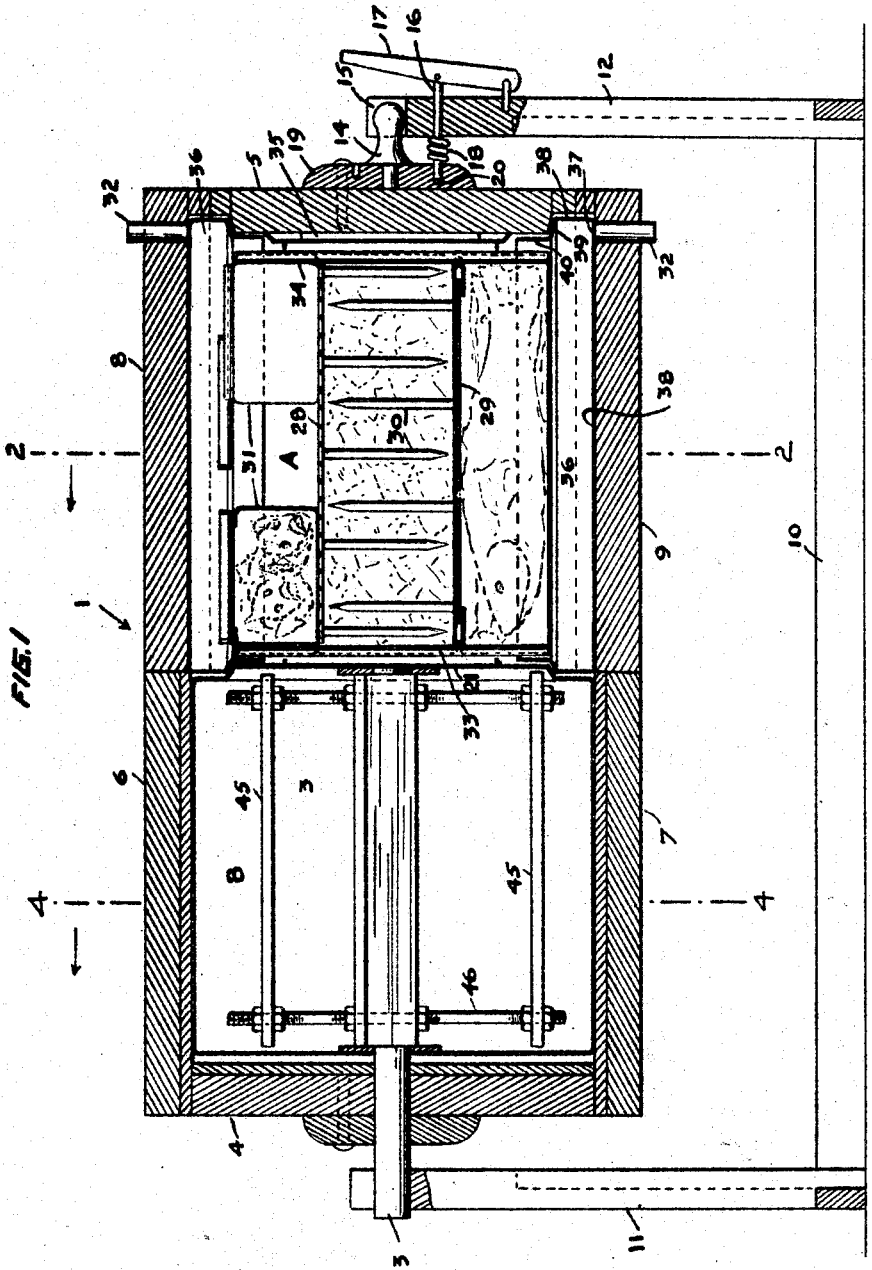
INVENTOR
L.M. BOWLUS
BY
ATT'YS

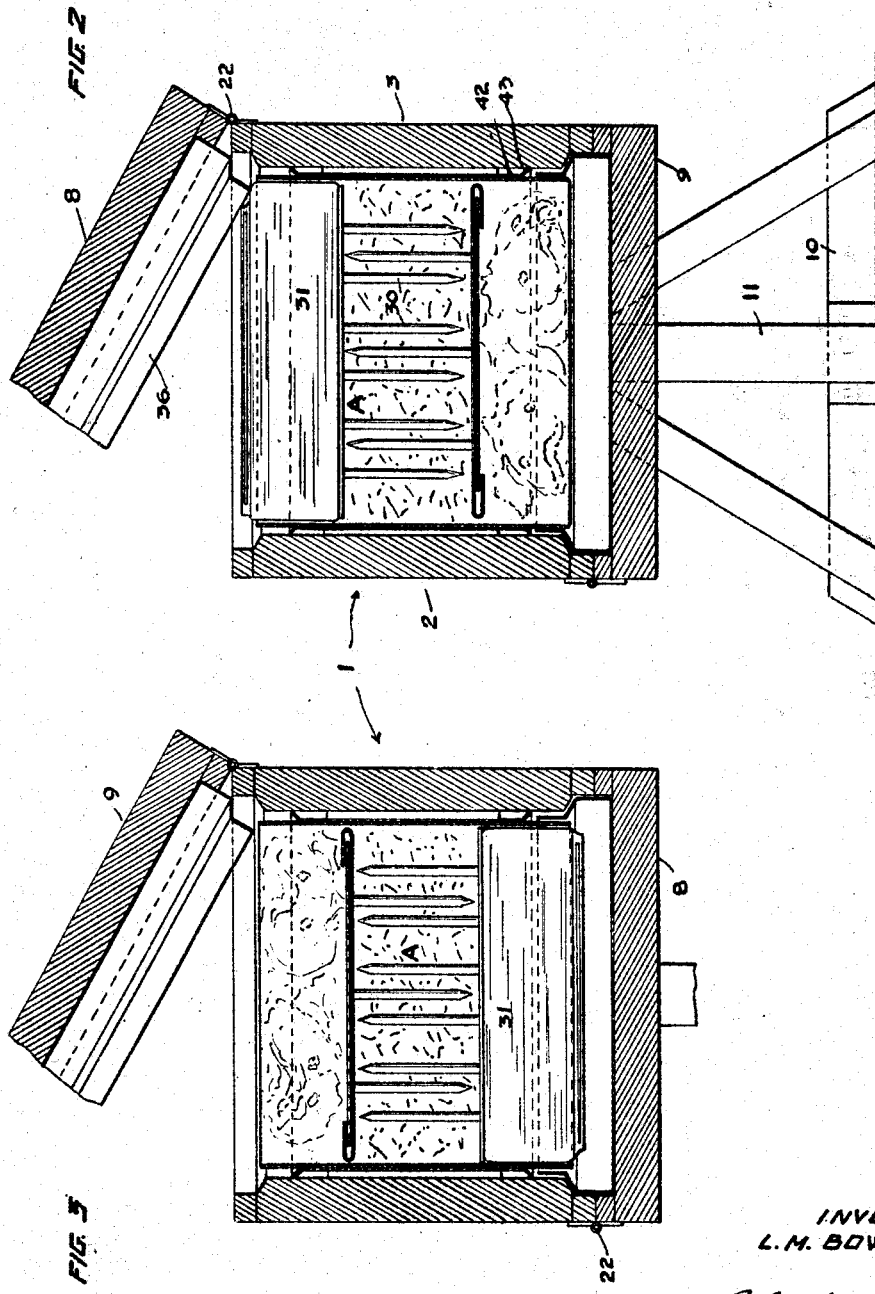

Nov. 10, 1925.
L. M. BOWLUS
ICE BOX
Filed Aug. 23, 1923
1,560,966
3 Sheets-Sheet 3
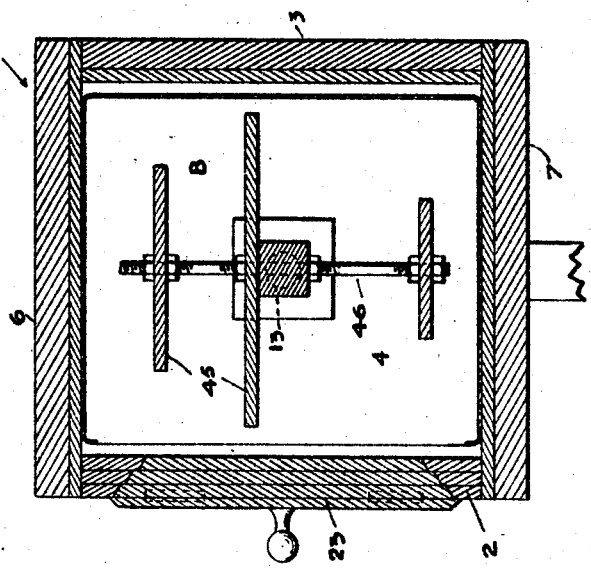
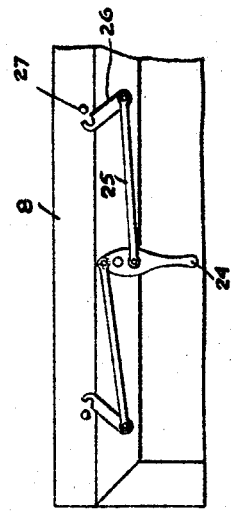
INVENTOR
L. M. BOWLUS
ATT'YS.

Patented Nov. 10, 1925.

1,560,966

UNITED STATES PATENT OFFICE.

LAUREN M. BOWLUS, OF SAN LUIS OBISPO, CALIFORNIA.

ICE BOX.

Application filed August 23, 1923. Serial No. 658,891.

*To all whom it may concern:*

Be it known that I, LAUREN M. BOWLUS, a citizen of the United States, residing at San Luis Obispo, in the county of San Luis Obispo and State of California, have invented new and useful Improvements in Ice Boxes, of which the following is a specification.

This invention relates to improvements in ice boxes of the type disclosed in Letters Patent of the United States, No. 1,451,416, issued to me on the 10th day of April, 1923.

The invention resides in the provision of an ice box which is especially adapted for containing and preserving fish and other sea foods, and foods other than fish and sea food, in a clean and sanitary manner.

An object of the invention is to provide an ice box which is constructed so that the odor of fish placed in the box is not taken on by other foods and the presence of fish with other foods, is not made objectionable.

Another object is to provide an ice box of the character described wherein fish and like sea food may be effectively exposed to the ice without actually contacting with the ice and the fish may be moved without disturbing the ice or pack of fish.

A further object of the invention is to provide an ice box of the character described which, although specially adapted for containing and preserving fish may be used for preserving other foods and for preserving liquids, the arrangement of the box being such that various kinds of foods or liquids may be preserved effectively and disposed in such manner that they may be more readily and easily removed and placed in the box than is the case with the ordinary ice box.

Another object of the invention is to provide an ice box containing a fish and ice storage chamber and a miscellaneous food storing chamber, all of which are arranged in a novel and effective manner for the purpose of preserving the foods in a clean and sanitary manner.

With the above mentioned and other objects in view, the invention consists in the novel construction and combination of parts hereinafter described, illustrated in the accompanying drawings, and set forth in the claims hereto appended, it being understood that various changes in the form, proportion, size and minor details of construction within the scope of the claims may be resorted to without departing from the spirit or sacrificing any of the advantages of the invention.

Referring to the drawings:

Fig. 1 is a longitudinal sectional view of the ice box of my invention.

Fig. 2 is a sectional view taken on the plane of line 2—2 of Fig. 1.

Fig. 3 is a fragmentary cross sectional view corresponding to Fig. 2 but showing the box as reversed.

Fig. 4 is a cross sectional view taken on the plane of line 4—4 of Fig. 1.

Fig. 5 is a fragmentary front elevation of the box showing in detail the lid locking device.

The embodiment of the invention shown in the accompanying drawing comprises a box or container 1, made up of side walls 2 and 3, end walls 4 and 5, sectional top and bottom walls 6 and 7 and hinged lids 8 and 9, which latter serve also as sectional top and bottom walls of the box. These walls may be built up so as to thermally insulate the container, in any suitable manner commonly employed in the ice box or refrigerating art, although they are otherwise shown in the drawing.

The box is reversibly mounted in a cradle like frame comprising a base 10 having upright standards 11 and 12. The standard 11 rotatably supports at its upper end a shaft 13 which extends loosely through the center of the end wall 4. The end wall 5 carries at its center a trunnion 14 removably fitted in an open slot bearing 15 on the standard 12.

A detent pin 16 is slidably mounted on the standard 12 and is operatively associated with an operating lever 17, likewise mounted on said standard. A spring 18 urges the pin towards a circular disk 19 on the wall 5 from which disk the trunnion 14 extends. This disk on opposite sides of its center has openings 20, into which the pin is adapted to extend to lock the box against turning, the pin being withdrawn to turn or permit reversing the box by working the lever 17.

The box is divided into a fish and ice storage chamber A, and a cooling chamber B, by a thin preferably sheet metal partition 21. The lids 8 and 9 are hinged as at 22 to upper and lower sides of the fish and ice chamber A, whereas the walls 6 and 7 are associated with the cooling chamber B. An ordinary ice box door 23, is provided in the side wall 2 for the chamber B, to permit access to the chamber. Each lid has a latch or lock to hold it shut, which latch or lock, as shown in Fig. 5, comprises a lever 24, pivoted on a side. Links 25 are pivoted to the lever so as to be extended from opposite sides thereof upon rocking the lever. These links are connected to notched latch members 26 pivoted on the side wall so that on extension of the links, the latch member will move to cause pins 27 on the lid to extend into the notches on said member and lock the lid in place. Opposite movement of the links unlatches said member 26.

The chamber A, has horizontal perforated partitions 28 and 29, removably mounted therein, between which chamber the ice is to be packed in such manner that storage fish spaces are provided above and below the partitions, that is between them and the lids 8 and 9. The partitions carry spikes 30 so that the cracked ice between said partitions may be easily and effectively packed. The partition 28 carries small receptacles 31, for small fish or sea food particles. To pack this chamber, one lid is opened and fish placed on the bottom. The partition 29 is then placed in the chamber so as to rest on the fish. Next cracked ice is packed in on said partition and then the partition 28 is placed on the ice. This is done so as to leave a storage space between the partition 28 and the upper lid, which space may be packed with fish also. The cold water from the ice drips through the perforations in the lowermost partition, keeps the fish cold and insures preservation thereof. By occasionally reversing the box the cooling effect on one side, and then on the other, of the ice pack is intensified by the ice water drip.

To get at the fish on the lower side, the box is quickly reversed and the fish may be easily and quickly removed. Thus, the fish are virtually kept "on the ice" without actual contact therewith and removal of fish from the box may be easily effected without disturbing the balance of the pack of fish. Usually miscellaneous sea foods are kept on one side of the ice and whole fish on the other side. Of course the use of chamber A is not limited to fish. Bottled soda water, or other liquids may be efficaciously packed in this chamber and kept a great deal colder through the ice water drip than in the ordinary ice box.

Each lid has a drain 32 therein. To prevent leakage of the water out around the lids, the lids and inner walls of the chamber A are specially constructed. A sheet metal lining comprising joined side and end walls 33 and 34 is mounted in the chamber so that it is spaced circumferentially from the chamber walls proper and the upper and lower edges of said walls are spaced well inwardly from the open sides of the box. Cleats 35 are mounted between the walls of the chamber and said lining at intervals, to space the lining and hold same in place.

A pan like receptacle 36 is attached to the inner side of each lid. The drains extend from openings 37 in said receptacles. The walls 38 of said receptacle extend between the walls proper of the chamber and the lining walls 33 and 34, in spaced relation to both. These walls extend upward vertically then inward as at 39, then upward as at 40. This forms a channel such that in turning or reversing the box, the water will be held in the pan or receptacle without seeping out between the box and lid, and when the box is turned so that the water will run out of the receptacles and downward, it will be directed into the spaces between the lining walls and box walls and into the other receptacle, then on the lower side of the box.

The chamber B is cooled through proximity to the ice and the chamber A, there being only the thin sheet metal partition wall between said chambers. The shaft 13 extending into the chamber B terminates close to the partition 21. This shaft is stationary and the box turns on it. Therefore, a plurality of horizontal shelves 45 are supported on the shaft, one above the other. Posts 46 support the shelves, one above the other. When the box is reversed the shelves remain stationary. Thus it will be seen that by providing the chamber B, in combination with the chamber A, an ice box for both fish and other foods is provided in a compact structure, such that the odor of the fish is not taken on by the other foods and the objections such as usually attend the storage of fish in an ordinary ice box are eliminated.

I claim:

1. An ice box comprising a receptacle, a partition dividing the receptacle into compartments, means on which said receptacle is rotatably mounted, one of said compartments being open on opposite sides, closures for said open sides of said compartment, the other of said compartments having an opening in one wall of the receptacle, a closure for said opening, partitions within the first named compartment between which a quantity of ice is adapted to be contained, which partitions provide storage space between them and the closures for said compartments and stationary supporting shelves in the second compartment around which the receptacle turns in moving on its support.

2. An ice box for fish and sea food comprising a receptacle open on upper and lower sides, closures for said open sides, means on which the receptacle is reversibly mounted, another receptacle contiguous and reversible with the first named receptacle and having an opening in one side thereof, a closure for said opening and stationary shelves disposed within and around which said receptacle moves.

3. An ice box comprising a receptacle, a partition dividing the receptacle into two compartments, an ice chamber in one of said compartments, said compartment having openings in opposite sides thereof, closures for said openings, a support on which said receptacle is reversibly mounted, which support includes a stationary member extending into the other compartment, said other compartment having an opening therein, a closure for said opening and a plurality of horizontal shelves fixed to said member and relative to which said receptacle is movable.

LAUREN M. BOWLUS.